US008846784B2

(12) United States Patent
Gäberlein et al.

(10) Patent No.: US 8,846,784 B2
(45) Date of Patent: Sep. 30, 2014

(54) ADDITIVE WITH APPLICATIONS IN CONSTRUCTION CHEMISTRY

(75) Inventors: Peter Gäberlein, Wasserburg am Inn (DE); Michael Schinabeck, Garching (DE); Stefan Friedrich, Garching (DE); Uwe Holland, Wehringen (DE); Michael Eberwein, Emmerting (DE); Patrick Weiss, Augsburg (DE); Manfred Schuhbeck, Trostberg (DE)

(73) Assignee: Construction Research & Technology GmbH, Tostberg (DE)

( * ) Notice: Subject to any disclaimer, the term of this patent is extended or adjusted under 35 U.S.C. 154(b) by 1132 days.

(21) Appl. No.: 11/990,175

(22) PCT Filed: Aug. 10, 2006

(86) PCT No.: PCT/EP2006/007935
§ 371 (c)(1),
(2), (4) Date: Apr. 21, 2008

(87) PCT Pub. No.: WO2007/017286
PCT Pub. Date: Feb. 15, 2007

(65) Prior Publication Data
US 2010/0234490 A1    Sep. 16, 2010

(30) Foreign Application Priority Data
Aug. 10, 2005   (DE) .......................... 10 2005 037 777

(51) Int. Cl.
| C08L 83/00 | (2006.01) |
| C04B 40/06 | (2006.01) |
| C04B 24/16 | (2006.01) |
| C04B 20/00 | (2006.01) |
| C04B 20/12 | (2006.01) |
| C04B 28/02 | (2006.01) |
| C09D 7/00 | (2006.01) |
| C04B 28/14 | (2006.01) |
| C04B 24/26 | (2006.01) |
| C04B 103/00 | (2006.01) |
| C08L 33/26 | (2006.01) |
| C04B 111/00 | (2006.01) |
| C04B 103/44 | (2006.01) |

(52) U.S. Cl.
CPC ......... *C04B 20/0004* (2013.01); *C04B 40/0633* (2013.01); *C04B 2103/0051* (2013.01); *C04B 2103/0066* (2013.01); *C04B 24/163* (2013.01); *C08L 33/26* (2013.01); *C04B 2103/0049* (2013.01); *C04B 2103/0067* (2013.01); *C04B 2103/0053* (2013.01); *C04B 20/12* (2013.01); *C04B 28/02* (2013.01); *C09D 7/002* (2013.01); *C04B 2111/00672* (2013.01); *C04B 28/14* (2013.01); *C04B 2103/44* (2013.01); *C04B 24/2641* (2013.01)

USPC ...... 523/201; 524/3; 524/5; 524/27; 524/433; 524/547

(58) Field of Classification Search
USPC ............ 523/201; 524/3, 5, 27, 433, 547, 555, 524/609
See application file for complete search history.

(56) References Cited

U.S. PATENT DOCUMENTS

| 4,218,262 | A | | 8/1980 | Warren |
| 4,631,188 | A | * | 12/1986 | Stoy et al. .................. 424/78.18 |
| 4,916,171 | A | | 4/1990 | Brown |
| 5,290,857 | A | * | 3/1994 | Ashida et al. ................... 525/65 |
| 5,441,810 | A | * | 8/1995 | Aizawa et al. ................ 428/354 |
| 5,476,885 | A | | 12/1995 | Tahara et al. |
| 5,684,075 | A | | 11/1997 | Patel et al. |
| 5,693,698 | A | | 12/1997 | Patel et al. |
| 5,705,222 | A | * | 1/1998 | Somasundaran et al. ..... 427/220 |
| 5,728,209 | A | | 3/1998 | Bury |
| 6,187,887 | B1 | | 2/2001 | Albrecht et al. |
| 6,316,107 | B1 | * | 11/2001 | Lubnin et al. ................. 428/407 |
| 6,337,131 | B1 | * | 1/2002 | Rupaner et al. ............... 428/403 |
| 6,656,645 | B2 | | 12/2003 | Tanaka et al. |
| 7,101,426 | B2 | * | 9/2006 | Tagge et al. ............. 106/217.01 |
| 7,238,760 | B2 | * | 7/2007 | Schinabeck et al. ......... 526/288 |
| 7,241,502 | B2 | * | 7/2007 | Anselmann et al. ......... 428/403 |
| 2003/0027787 | A1 | * | 2/2003 | Couture et al. ................. 514/54 |
| 2004/0024154 | A1 | | 2/2004 | Schinabeck et al. |
| 2004/0147406 | A1 | | 7/2004 | Go Boncan |
| 2004/0265387 | A1 | * | 12/2004 | Hermeling et al. ........... 424/486 |
| 2005/0005870 | A1 | * | 1/2005 | Fritter et al. .................. 119/173 |
| 2005/0013992 | A1 | * | 1/2005 | Azad et al. .................... 428/327 |
| 2007/0184266 | A1 | | 8/2007 | Steiner et al. |

FOREIGN PATENT DOCUMENTS

| DE | 22 00 163 A1 | 7/1973 |
| DE | 26 07 757 A1 | 9/1977 |
| DE | 26 12 101 A1 | 9/1977 |
| DE | 198 06 482 A1 | 8/1999 |

(Continued)

*Primary Examiner* — Hannah Pak
(74) *Attorney, Agent, or Firm* — Fulbright & Jaworski LLP

(57) ABSTRACT

Additives for application in construction chemistry are proposed comprising an organic and/or inorganic core component A) with rheology-enhancing properties and a shell component B) applied to the same by virtue of physical and/or chemical interactions which acts as a coating. Component A) should be a of water-soluble and/or water-swellable and/or water-absorbable compound of the non-cellulose type with viscosity-enhancing properties in the final application. The shell component B) should preferably be a film-forming polymer which is able to release component A) during the application in construction chemistry in a retarded manner such as for example polyvinyl alcohol, polyvinyl acetate and polyethylene glycol. Component B) can be composed of several layers and comprises at least one reactive layer. The new additive is used as an additive with a time-delayed action in paints and also for timed control of the increase in viscosity or development of rheology in building material systems based on inorganic binders.

27 Claims, No Drawings

(56) References Cited

FOREIGN PATENT DOCUMENTS

| | | |
|---|---|---|
| DE | 199 14 367 | 10/1999 |
| DE | 100 37 629 A1 | 2/2002 |
| DE | 696 14 287 | 5/2002 |
| DE | 103 16 476 A1 | 10/2004 |
| DE | 10 2004 051 2 | 5/2005 |
| DE | 10 2004 013 158 A1 | 10/2005 |
| DE | 10 2004 032 3 | 2/2006 |
| DE | 10 2005 037 777 A1 | 2/2007 |
| EP | 0 348 565 A1 | 1/1990 |
| WO | WO 92/20757 A1 | 11/1992 |
| WO | WO 02/083743 A1 | 10/2002 |
| WO | WO 2005/035603 A1 | 4/2005 |
| WO | WO 2007/017286 | 2/2007 |

\* cited by examiner

ADDITIVE WITH APPLICATIONS IN CONSTRUCTION CHEMISTRY

RELATED APPLICATIONS

This application is a §371 of PCT/EP2006/007935 filed Aug. 10,2006, which claims priority from German Patent Application No. 10 2005 037 777.7 filed Aug. 10, 2005.

DESCRIPTION

The present invention concerns a new additive for applications in construction chemistry consisting of a core component A) and a shell component B) applied to the same.

Modern building materials based on inorganic binders such as e.g. tile adhesives, plasters, levelling compounds, wall mortars etc. must usually have an organic additive in order to fulfil the requirements made on them. In this connection an average person skilled in the art will know that the type of organic modification has a greater effect on the most important properties of these formulations for construction chemicals than the selection and composition of the inorganic base components. Examples of these properties are the water retention capacity or the stability of tile adhesives and filling compounds as well as the general rheological profile of such building materials.

The so-called modified cellulose ethers play almost the most important role in the case of such organic modifications whereby this term embraces a large variety of multiple substance systems. Use of such cellulose ethers has enabled numerous building material properties to be specifically adapted to the respective application.

The composition of the said components and their effects on the adhesive tendency of corresponding building material systems is described in detail in the European Patent EP 530 768 B1. Combinations of additives are used which consist of water-soluble cellulose ethers and derivatives thereof, polyacrylamide, alkali or ammonium salts of cross-linked polyacrylates and polyacrylates that are optionally additionally grafted with starch which are usually referred to as superabsorbents (SAB); starch ethers and additives of alkali, alkaline earth or ammonium salts of condensation products of naphthalenesulfonic acid or phenolsulfonic acid with formaldehyde or with sulfonic acid-modified polycondensation products of melamine and formaldehyde may also be suitable. The latter products improve especially the working properties of building material mixtures containing water by reducing the adhesive tendency of the building material mixtures containing water. According to EP 530 768 A1 this multicomponent additive contains the starch ether together with polyacrylamide as a synthetic polymer compound in a blend with water-soluble mixed substituted cellulose ethers which, in addition to hydroxyethyl substituents, have 3-alkoxy-2-hydroxypropyl residues with 2 to 6 carbon atoms in the alkoxy group. The selection and use of the water-soluble mixed substituted cellulose ethers that are blended with the starch ethers and the synthetic polymer compound is of decisive importance for the intended improvements. In this connection cellulose ether derivatives can be preferred which, in addition to the hydroxyethyl substitution, have at least one 3-alkoxy-2-hydroxypropyl residue with a straight-chain alkoxy residue with 2 to 6 C atoms.

DE 39 135 18 A1 also teaches the composition of a appropriately modified cellulose ether systems. In particular it describes the special effect of a particular mixed substituted cellulose ether variant which has 3-alkoxy-2-hydroxypropyl residues with 2 to 8 carbon atoms in the alkoxy group in addition to hydroxyethyl substituents and is used in combination with starch ethers and anionic polyacrylamides.

U.S. Pat. No. 4,487,764 B1 protects a special combination of the common cellulose ethers with swellable and non-flocculating organic polymers which are present in the form of cross-linked polyacrylates i.e. as superabsorbers and should ensure particularly advantageous working properties.

Special viscosity-enhancing effects are also known from U.S. Pat. No. 5,432,215 B1 in which a combination of cellulose ethers and superabsorbers is used in this connection.

DE 39 200 25 C2 describes considerable improvements in the working properties of plaster systems in the machine. In particular they should reduce the destruction of the initially formed paste structure by corresponding shear forces.

Recently cellulose ether substitutes based on more suitable polysaccharides or synthetic and optionally water-swellable sulfogroup-containing copolymers have been increasingly used. Such compounds are described for example in DE 198 06 482 A1, DE 100 37 629 A1, WO 2005/035603 and DE 10 2004 032 304.6 where they are used either as a complete or as a partial substitute for the cellulose ethers that would otherwise be used.

Compositions containing organic components for coating polyacrylamide are known from both DE 26 12 101 A1 and DE 26 07 757 A1. However, the said organic components are not polymers and they also do not exhibit any film formation at all. However, they are suitable for avoiding lump formation. Polymers which also withstand extreme shear conditions and stirring conditions and which can develop a delayed action are not described in these publications.

In general it may be ascertained that high-quality building materials which also suffice higher technical requirements can be produced by using the described additives. However, the amount of effort required to further improve the working properties of such building material systems which contain such additives is becoming greater and greater. Thus the main focus is on the processing of the finished building material that has already been stirred with the mixing water where in particular the amount of force required to stir a building material that is available in a dry form plays an equally important role. As the energy required to stir a building material system becomes less and less, the employees will also become less tired and the technical stirring systems will be subject to less wear and their susceptibility to failure will be reduced.

Coated, water-soluble or water-swellable polymer particles are known from WO 92/20727. Crystalline substances such as sodium sulfate or sodium carbonate are used as a coating material and preferably saturated salt solutions are sprayed in mixers onto polymer particles. The particles coated in this manner have an improved dispersing power in aqueous solutions; however, the dissolving properties under difficult conditions is still unsatisfactory. In addition the high contents of coating agent are an undesired weight ballast.

DE 103 16 476 A1 also describes a coated water-soluble polymer in which the coating contains water glass. Polymer particles coated in this manner are claimed to have excellent dispersing and solubility characteristics which are particularly beneficial especially under difficult dissolution conditions. An agglomeration of the polymer particles in the aqueous solution is largely suppressed.

In the sense of a further development of the known state of the art, the object of the present invention was to develop additives for in the widest sense construction chemical systems, dispersions and paint formulations with the primary aim of especially improving the incorporation of these additives. These new additives should above all ensure at least the known good properties of construction chemical systems and if possible give the systems to which they are added additional positive properties.

This object was achieved with the aid of an additive for applications in construction chemistry comprising an organic and/or inorganic core component A) with rheology-enhancing properties and a shell component B) applied to the same by virtue of physical and/or Chemical interactions which acts as a coating.

This additive according to the invention has been surprisingly shown not only to fulfil the concrete problem by improving the stirrability and in particular by having a positive effect on the properties of the wet mortar, but also in the case of an application of these additives in thickener systems it has turned out that the time of addition can play a positive role. Thus for example the delayed addition of a thickener based on an anionic polyacrylamide that was used accordingly in a formulation as an additive according to the invention considerably improved the stirrability and at the same time it was possible to considerably reduce the amount of additive used without having a negative effect on the wet mortar properties. Furthermore the unexpected properties of the additives according to the present invention not only allow them to be used in building chemical systems which contain hydraulic binders, but also in other systems such as paints and lacquers which clearly extends beyond the application field envisaged according to the object of the invention. Overall the entirety of the positive effects found for the additive according to the invention could not have been predicted.

With regard to the essential component A) according to the invention, the present invention takes into account variants with properties that a person skilled in the art refers to as plastic and/or dynamic viscosity, flow limit, rheopexy and thixotropy. Water-soluble and/or water-swellable and/or water-absorbable compounds of the non-cellulose type have proven to be particularly suitable as component A) where these are intended to have viscosity-enhancing properties in the final application. Compounds from the group comprising oligosaccharides and polysaccharides, preferably starch ethers, welan gum, diutan gum, xanthan, chitosan or guar derivatives and/or sulfo group-containing copolymers and/or copolymes based on acrylamide and/or other hydrocolloid-forming or hydrogel-forming substances which can also be used in any desired mixture have proven to be particularly suitable components A). Derivatives thereof that can be prepared by physical and/or chemical processes such as e.g. etherification and esterification processes also of course come into consideration. Typical chemical derivatives are representatives of the carboxyl, carboxyalkyl and hydroxyalkyl type. According to the present invention synthetic water-soluble polymers can be composed of water-soluble and ethylenically unsaturated monomers that can be used to form non-ionic, cationic, anionic or amphoteric polymers.

The above-mentioned sulfo group-containing copolymers should be representatives which consist of up to 4 structural units in accordance with the copolymers and terpolymers according to DE 100 37 629 A1, DE 198 06 482 A1, WO 2005/035603 and DE 10 2004 032 304.6 (not yet published). The disclosure of these four documents is a substantial component of this application. Water-soluble sulfo group containing copolymers which consist of at least three structural groups a), b), c) and/or d) are particularly suitable.

The first structural group is usually a sulfo group-containing substituted acryl or methacryl derivative of formula (I):

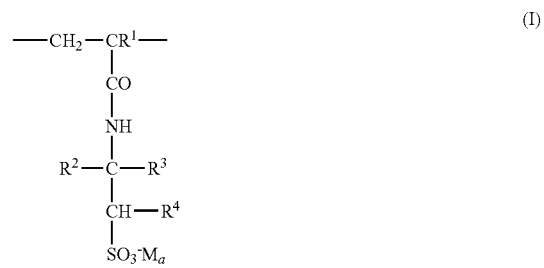

in which
$R^1$=hydrogen or methyl
$R^2, R^3, R^4$=hydrogen, aliphatic hydrocarbon residue with 1 to 6 C atoms, phenyl residue optionally substituted with methyl groups and
M=hydrogen, monovalent or divalent metal cation, ammonium or an organic amine residue and
$a=½$ or 1.

Sodium, potassium, calcium or magnesium ions are preferably used as the monovalent or divalent metal cation. Substituted ammonium groups which are derived from primary, secondary or tertiary $C_1$ to $C_{20}$ alkylamines, $C_1$ to $C_{20}$ alkanolamines, $C_5$ to $C_8$ cycloalkylamines and $C_6$ to $C_{14}$ arylamines are preferably used as organic amine residues. Examples of such amines are methylamine, dimethylamine, trimethylamine, ethanolamine, diethanolamine, triethanolamine, cyclohexylamine, dicyclohexylamine, phenylamine and diphenylamine in the protonated ammonium form.

The structural group a) of A) is derived from monomers such as 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid. 2-Acrylamido-2-methylpropane-sulfonic acid is particularly preferred.

The second structural group b) corresponds to formula (II):

in which
$R^1$=has the above-mentioned meaning.
$R^5$ and $R^6$=independently of one another represent hydrogen, an aliphatic hydrocarbon residue with 1 to 20 C atoms, a cycloaliphatic hydrocarbon residue with 5 to 8 C atoms or an aryl residue with 6 to 14 C atoms.

The following compounds preferably come into consideration as monomers which form the structure (II): acrylamide, methacrylamide, N-methylacrylamide, N,N-di-methylacrylamide, N-ethylacrylamide, N-cyclohexylacrylamide, N-benzylacryl-amide, N-methylolacrylamide, N-tertiary butylacrylamide etc.

The third structural group c) corresponds to formula (III)

in which
$y = -COO(C_nH_{2n}O)_p-R^7, -(CH_2)_q-O(C_nH_{2n}O)_p-R^7$
$R^7 =$

as well as unsaturated or saturated, linear or branched aliphatic alkyl residue with 10 to 40 C atoms $R^8 = H, C_1$ to $C_6$ alkyl, arylalkyl group with $C_1$ to $C_{12}$ alkyl and $C_6$ to $C_{14}$ aryl residue n=2 to 4
p=0 to 200
q=0 to 20
x=0 to 3 and
$R^1$ has the above-mentioned meaning.

Preferred monomers which form the structure (III) are tristyrylphenol polyethylene glycol 1100 methacrylate, behenyl polyethylene glycol 1100 methacrylate, stearyl polyethylene glycol 1100 methacrylate, tristyrylphenol polyethylene glycol 1100 acrylate, tristyrylphenol polyethylene glycol 1100 monovinyl ether, behenyl poly-ethylene glycol 1100 monovinyl ether, stearyl polyethylene glycol 1100 monovinyl ether, tristyrylphenol polyethylene glycol 1100 vinyloxybutyl ether, behenyl polyethylene glycol 1100 vinyloxybutyl ether, tristyrylphenol polyethylene glycol-block-propylene glycol allyl ether, behenyl polyethylene glycol-block-propylene glycolallyl ether, stearyl polyethylene glycol-block-propylene glycol allyl ether etc.

The fourth structural group d) corresponds to formula (IV)

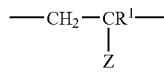 (IV)

in which
$Z = -(CH_2)_q-O(C_nH_{2n}O)_p-R^9$
$R^9$ = denotes H, $C_1$ to $C_4$ alkyl and
$R^1$, n, p and q have the above-mentioned meaning.

Preferred monomers which form the structure (IV) are allyl polyethylene glycol-(350 to 2000), methyl polyethylene glycol-(350 to 2000)-monovinyl ether, polyethylene glycol-(500 to 5000)-vinyloxy-butyl ether, polyethylene glycol-block-propylene glycol-(500 to 5000)-vinyloxy-butyl ether, methyl polyethylene glycol-block-propylene glycol allyl ether etc.

It is regarded as preferred that the component A) in the form of a copolymer consists of 3 to 96 mole % of structural group a), 3 to 96 mole % of structural group b), 0.01 to 10 mole % of structural group c) and/or 0.1 to 30 mole % of structural group d). Preferably used copolymers contain 30 to 80 mole % a), 5 to 50 mole % b), 0.1 to 5 mole % c) and/or 0.2 to 15 mole % d).

In the following copolymers consisting of structural groups a), b) and c) are referred to as type A), copolymers consisting of structural groups a), b), c) and d) are referred to as type B and copolymers consisting of structural groups a), b) and d) are referred to as type C.

Within the scope of the present invention it is also possible that the copolymers according to the invention of type B and C additionally contain up to 50 mole % and in particular up to 20 mole % based on the sum of structural groups a), b), c) and d) of a further structural group e) of formula (V).

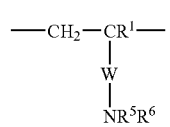 (V)

in which
$W = -CO-O-(CH_2)_m-, -CO-NR^2-(CH_2)_m-$
m = represents 1 to 6 and
$R^1, R^2, R^5$ and $R^6$ have the above-mentioned meaning.

The following compounds preferably come into consideration as monomers which form the structure (V): [3-(methacryloylamino)-propyl]-dimethylamine, [3-(acryloylamino)-propyl]-dimethylamine, [2-(methacryloyl-oxy)-ethyl]-dimethylamine, [2-(acryloyl-oxy)-ethyl]-dimethylamine, [2-(methacryloyl-oxy)-ethyl]-diethylamine, [2-(acryloyl-oxy)-ethyl]-diethylamine etc.

Within the scope of the present invention it is in addition possible that in the copolymeric component A) up to 50% of the structural group a) is replaced by a sulfonic acid-containing betaine monomer of formula (VI).

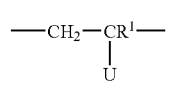 (VI)

in which
U =

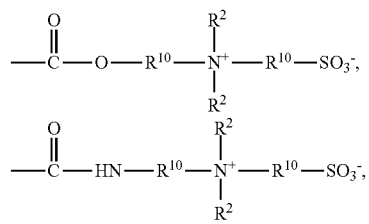

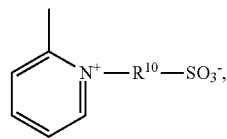

$R^{10} =$

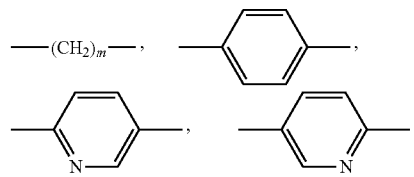

and
$R^1, R^2$ and m have the above-mentioned meaning.

The following compounds preferably come into consideration as monomers which form the structure (VI): N-(3-sulfopropyl)-N-methacryloxyethyl-N'-N-dimethyl-ammonium betaine, N-(3-sulfopropyl)-N-methacrylamidopropyl-N,N-dimethyl-ammonium betaine and 1-(3-sulfopropyl)-2-vinyl-pyridinium betaine. Although these monomers also contain a cationic structural group, it does not have an adverse effect on the respective application in construction chemistry.

The copolymers can optionally have a slightly branched or cross-linked structure by incorporation of small amounts of cross-linkers. Examples of such cross-linker components are triallylamine, triallylmethylammonium chloride, tetraallylammonium chloride, N,N'-methylene-bis-acrylamide, triethylene glycol-bis-methacrylate, triethylene glycol-bis-acrylate, polyethylene glycol(400)-bis-methacrylate and polyethylene glycol(400)-bis-acrylate. These compounds may only be used in such amounts that water-soluble copolymers are still obtained. In general the concentration will seldom be above 0.1 mole % based on the sums of the structural groups a), b), c), d), e) and f); however, a person skilled in the art can easily determine the maximum amount of cross-linker components that can be used.

The described copolymers are prepared in a known manner by linking the monomers forming the structures a) to d) by radical, ionic or complex coordinative bulk, solution, gel, emulsion, dispersion or suspension polymerization. Since the products according to the invention are water-soluble copolymers, polymerization in an aqueous phase, polymerization in inverse emulsion or polymerization in inverse suspension are preferred. In particularly preferred embodiments the reaction is carried out as a gel polymerization in an aqueous phase.

If component A) in the additive according to the invention contains polyacrylamides among others, they should preferably have non-ionic, anionic, cationic or amphoteric properties and it should particularly preferably be a homopolymer and/or copolymer of acrylamide with the monomers acrylic acid, acrylamido-propanesulfonic acid, quarternated dimethylaminopropyl acrylamide or quarternated dimethylaminoethyl acrylate. A polyacrylamide should be above all understood as a water-soluble homopolymer or copolymer which contains acrylamide as a monomer component. In addition to the already mentioned monomer units, methacrylic acid, vinylsulfonic acid, methalyllsulfonic acid, maleic acid, fumaric acid and itaconic acid also come into consideration as anionic comonomers. All these specified acids can be polymerized as free acids, as salts or as mixtures thereof. Monomers that are completely water-soluble as well as those that have a limited water-solubility can be used as non-ionic comonomers for the polyacrylamides such as for example (meth)acrylnitrile, N,N-dimethylacrylamide, vinylpyridine, vinyl acetate, methacrylamide, hydroxy group-containing esters, polymerizable acids, dihydroxyethyl and dihydroxypropyl esters of acrylic acid and methacrylic acid, esters containing amino groups and amides of polymerizable acids such as for example dialkylamino esters or amides such as dimethylaminopropyl acrylamide.

Comonomers in the form of cationized esters of (meth) acrylic acid, cationized amides of (meth)acrylic acid and cationized N-alkylmono-amides and diamides with $C_{1-6}$ alkyl residues are for example suitable as cationic polyacrylamides.

In the case of hydrocolloid-forming or hydrogel-forming substances as component A), the present invention preferably suggests polyelectrolytes based on acrylic acid or acrylamide derivatives or other ethylenically unsaturated monomer building blocks preferably containing cationic and/or anionic charges.

Additives which contain component A) in a cross-linked or partially cross-linked form have proven to be particularly suitable.

The additive according to the invention can then contain a member of the group borax, aluminium sulfate or zeolite as the inorganic component A) for certain applications.

Overall component A) is only limited with regard to its essential inventive property i.e. an enhancement of rheology. However, in general all organic and/or inorganic compounds come into consideration as component A) where the particle size is also not subject to any major limitation. Nevertheless the present invention takes into consideration a preferred variant in which component A) has an average particle-size range of ≤500 μm and preferably <250 μm. The distribution of particle sizes can be homogeneous or heterogeneous within the proposed particle size ranges i.e. it can consist of mainly larger particles or smaller particles which can also approximate the respective extremes and/or only cover these extremes depending on the respective application.

Component B) of the additive which acts as a coating or shell, should according to the invention preferably be a film-forming polymer which initially completely surrounds the component A) and is released in a retarded manner during its application in construction chemistry. The following are especially suitable for this: polyvinyl alcohol, polyvinyl acetate, polyethylene glycols with one or two hydrophobic end groups, modified polypropylene glycols, copolymers of polyethylene and polypropylene glycol, polyvinyl pyrrolidine, polyvinylidene chloride, alginates, cellulose derivatives; starch derivatives, gelatins, waxes and also any mixtures of the said representatives.

In principle the shell component B) should be a compound which, due to physical and/or chemical interactions, can be applied to the core component A) and in the process of which forms chemical and/or physical and preferably reversible cross-links. Dialdehyde such as e.g. glyoxal, diisocyanates, dioles, carboxylic acids and derivatives thereof and any mixtures thereof are regarded as particularly preferred.

The series of preferred representatives of component B) can be extended as desired while observing the required properties. Representatives come into consideration as suitable compounds which contain at least two functional groups which are able to react with the functional groups, which are essentially the acidic groups or hydroxyl groups of component A). Suitable functional groups for this have already been mentioned above:

hydroxyl, amino, epoxy, isocyanate, ester, amido or aziridino groups. Typical representatives thereof are ethylene glycol, diethylene glycol, triethylene glycol, tetraethylene glycol, polyethylene glycol, glycerol, polyglycerol, triethanolamine, propylene glycol, polypropylene glycol, block copolymers of ethylene oxide and propylene oxide, ethanolamine, sorbitan fatty acid esters, ethoxylated sorbitan fatty acid esters, trimethylolpropane, pentaerythritol, 1,3-butanediol, 1,4-butanediol, polyvinyl alcohol, sorbitol, starch, polyglycidyl ether, polyaziridine compounds, 1,6-hexamethylene diethylene urea, diphenylmethane-bis-4,4'-N,N'-diethylene urea, halogen epoxy compounds such as epichlorohydrin and α-methylepifluorohydrin, polyisocyanates, alkylene carbonates, bisoxazolines and oxazolidones, polyamido amines and products of their reaction with epichlorohydrin. Finally the following also come into consideration: polyquarternary amines such as e.g. condensation products of dimethylamine with epichlorohydrin and homopolymers and copolymers of dimethylaminoethyl(meth)acrylate which can optionally also be quarternated with methyl chloride.

Finally multifunctional bases are also suitable as a suitable component B) which must also be able to form ionic cross-links for which polyamines and quarternated salts thereof are particularly suitable.

As a further variant of component B) the present invention also envisages that it contains additional process additives which are preferably derived from the group of plasticizers such as e.g. phthalates and polyethylene glycols, anticaking agents such as e.g. triethyl citrate, polysorbate 80, stearic acid, sodium lauryl sulfate, talcum or antifoaming agents.

The invention takes into consideration that as a further variant component B) can be composed of several layers which preferably comprise at least one reactive layer. According to definition "reactive layer" is understood to mean that the component directly interacts with component A) usually as part of a polymerization process. This means that in the case of a two-layer structure, the layer facing component A) as well as the outermost layer can have been present as reactive layers and have reacted with component A). However, all other variants are also conceivable in which for example only the innermost layer represents a reactive layer and for example has interacted with component A) or only the outermost layer. Finally if component B) is composed of at least three layers, it is possible that neither the innermost nor the outermost layer is a reactive layer and the reactivity is limited to layers which are arranged between the innermost and the outermost layer. In this case they are mainly layers which have developed their respective reactivity in a retarded manner; i.e. not until the overlying layers towards the outside have been separated from the additive by abrasion and/or dissolution processes. In general it should be noted that component B) reacts with component A) which involves at least one reactive layer or further components react with component B) that has already been applied to component A). In this manner the essential inventive property of the present additive i.e. its rheology-enhancing effect can be specified and controlled depending on the respective application medium and the desired release profile of the core layer A) by selecting suitable shell components.

The above-mentioned also encompasses an additive variation in which component B) is applied to component A) with the aid of component C). In this case it has proven to be particularly advantageous when component C) in a liquid form or as a physical mixture results in a chemical cross-linking of component B) on component A). Particularly suitable representatives of component C) are dialdehydes such as glyoxal, diisocyanates, dioles, dicarboxylic acids and derivatives and any mixtures thereof. However, in principle all types of compounds which can also be used as component B) come into consideration as a suitable component C).

From a practical point of view and taking into consideration the very broad application potentials, the additive according to the invention should not have excessively large particle sizes. For this reason the present invention envisages an average particle size range for the additive consisting of components A) and B) which is ≤2000 µm and preferably ≤1000 µm.

In addition to the additive itself, the present invention also claims the use of this additive especially as an additive with an action that has a delayed onset. The retardation is primarily due to component B) i.e. the shell component which as already described can comprise a variable number of layers and in particular reactive layers. In this connection the additive according to the invention is especially suitable for use in paints and in this case above all in dispersion paints and inks, in lacquers, in pigment preparations and pigment concentrates which is also encompassed by the present invention.

A special variant of use also relates to the time delay in which the increase in viscosity and/or rheology development in filled aqueous systems is time controlled. This preferably occurs in combination with cellulose ethers and/or cellulose ether substitutes. As already described these cellulose ether substitutes are representatives of the group oligosaccharides and polysaccharides, preferably starch ethers, welan gum, diutan gum, xanthan, chitosan or guar derivative and/or sulfo group-containing copolymers and/or copolymers based on acrylamide and/or other hydrocolloid-forming or hydrogel-forming substances as already described in detail above with regard to component A).

The filled aqueous systems are preferably building material systems based on inorganic and in particular mineral binders and particularly preferably cement, gypsum, lime, anhydrite or other binders based on calcium sulfate.

Tile adhesives, plasters, setting compounds, joint fillers, wall mortars, repair mortars and jointing mortars are particularly suitable representatives of such building material systems which according to the present invention are preferably suitable for mechanical stirring and/or mechanical application and in this connection they in particular constitute very stable treated and/or thickened dry mortars such as plasters or tile adhesives.

Overall the additives for applications in construction chemistry according to the invention enable considerable improvements compared to the previously known state of the art due to their time controllable rheology-enhancing properties which is not least due to the different compounds compared to the state of the art which the additive contains as component A) or component B).

The following examples illustrate the advantages associated with the proposed additive.

EXAMPLES

Example 1

Preparation of a Polyacrylamide Coated with Polyvinyl Alcohol 300 g of a commercially available anionic polyacrylamide with a charge of 20 to 50% was placed first in a fluidized-bed granulator from "Glatt Ingenieurtechnick GmbH". The material was heated in the fluidized bed by a current of incoming air (70 m$^3$/h) heated to 65° C. This resulted in a bed temperature of 55° C. 300 g Mowiol 10 to 98 (polyvinyl alcohol 10 percent solution) was coated onto the granulate via a two-fluid nozzle from the Schlick Company at a metering rate of about 3.2 g/min. The amounts of coating material were varied and are stated as a weight percentage of coating material based on the commercially available anionic polyacrylamide with a charge of 20 to 50%. Coated samples containing 1%, 2%, 3%, 5% and 10% Mowiol were prepared.

Example 2

Preparation of a Polyacrylamide Coated with Polyvinyl Acetate 100 g polyvinyl acetate (PVAc) of average chain length (Aldrich) was dissolved in 2 l acetone. 100 g of this 5% PVAc solution was added together with 50 g of a finely ground commercially available anionic polyacrylamide with a charge of 20 to 50% from SNF (UK) Ltd. in a 250 ml round bottomed flask and thoroughly mixed. The solvent was evaporated to dryness by means of a rotary evaporator at a water bath temperature of about 50° C. and under a slight vacuum. The powder obtained was carefully ground in a mortar and checked for its technical application properties.

Example 3

Preparation of a Polyacrylamide the Surface of which was Cross-Linked with Glyoxal 300 g of an anionic polyacrylamide with a charge of 20 to 50% was placed first in a fluidized bed granulator and heated in the fluidized bed by a current of incoming air (70 m$^3$/h) heated to 80° C. This resulted in a bed temperature of 70° C. 300 g of a 1% aqueous glyoxal solution was sprayed onto the polyacrylamide at a metering rate of about 3.2 g/min. The amounts of glyoxal were varied and applied in amounts of 1, 2 and 3% by weight based on the commercially available anionic polyacrylamide.

Example 4

Coating of Polyacrylamide with a Polyvinyl Alcohol Post-Cross-Linked with Glyoxal A polyacrylamide prepared analogously to example 1 and coated with 3% by weight polyvinyl alcohol was sprayed with 300 g of a 1% glyoxal solution (metering rate of 3 g/min) in a fluidized bed at a fluidized bed temperature of 60° C. which resulted in post cross-linking of the polyvinyl alcohol. The amounts of glyoxal were varied and adjusted to 1, 2 and 3% by weight based on the already coated polyacrylamide.

Example 5

Coating of Polyacrylamide with a Mixture of Polyvinyl Alcohol and Glyoxal 300 g of an anionic polyacrylamide with a charge of 20 to 50% was placed first in a fluidized bed granulator according to example 1 and heated in the fluidized bed by a current of incoming air (70 m$^3$/h) heated to 65° C. This resulted in a bed temperature of 55° C. 330 g of a mixture of Mowiol 10 to 98 and glyoxal was coated onto the granulate at a metering rate of about 3.2 g/min. The mixture contained 10% by weight Mowiol 10 to 98 and 1% by weight glyoxal. The amounts of coating material were varied and adjusted in amounts of 1, 2, 3, 5 and 10% by weight coating material (stated in weight percent of coating material based on the polyacrylamide).

Example 6

Coating of Polyacrylamide with a Mixture of Low-Molecular Cellulose Ether and Glyoxal 300 g of an anionic polyacrylamide with a charge of 20 to 50% was placed first in a fluidized bed granulator according to example 1 and heated in the fluidized bed by a current of incoming air (70 m$^3$/h) heated to 65° C. This resulted in a bed temperature of 55° C. 330 g of a mixture of Pharmacoat 606 (Hypromellose from the Syntapharm Company) and glyoxal was coated onto the granulate at a metering rate of about 3.2 g/min. The mixture contained 10% by weight Pharmacoat and 2% by weight glyoxal. The amounts of coating material were varied and preparations containing 1, 2, 5 and 10% by weight coating material were produced (stated in weight percent of coating material based on the polyacrylamide used).

The polyacrylamides coated according to examples 1 to 5 (see table) were tested for their relevant properties in a tile adhesive formulation mixture 1:

1 kg tile adhesive mortar was stirred with a commercial drill (1000 W, 800 rpm) and a helical stirrer. 340 g mixing water was added per 1000 g dry mortar.

Mixture 1

| Component | Weight % |
| --- | --- |
| quartz sand 0 to 0.5 mm | 47.24 |
| Portland cement CEM I 52.5 R | 36.60 |
| Metakaolin | 7.20 |
| dispersion powder (copolymer based on vinyl acetate/ethylene) | 3.00 |
| cellulose ether Culminal MHPC 20000 p | 0.60 |
| accelerator (calcium formate) | 0.60 |
| hydroxypropyl starch ether | 0.06 |
| limestone powder | 4.10 |
| cellulose fibre | 0.60 |
| water | 360 g/kg powder |

Test Methods

Determination of Stability (Slip Test)

For the slip test a tile (15×25 cm, weight 1.9 kg) is placed in the tile adhesive formulation and loaded for 30 seconds with 5 kg weight. A mark is applied to the upper edge of the tile and the sample setup is placed vertically. It is subsequently observed whether and to what extent the tile slips. A slip of 1 to 10 mm is rated as stable.

Viscosity Measurement

The stirred fresh mortar is placed as free from air bubbles as possible in a 250 g can using a spatula. The can is filled to the upper edge and is smoothed with the spatula. Subsequently the material is compacted with the aid of a lifting table (10 lifts, about 1 lift per second) and covered with the can lid (reversed). From this moment the time measurement is started. The first viscosity measurement (Brookfield-Viscosimeter, Model RV) takes place after 5 min, the second after 20 min. It is measured using a TF spindle (spindle 96 (TF) with a mark at 3.2 cm) at 2.5 rpm by immersing the spindle in the mortar up to the mark. In each case the highest indicated value mPa*s or cP) is noted. At least 3 values should be determined per measurement (tolerance between the measurements: +/−10%).

TABLE 1

| polyacrylamide (PAM) | | amount used | viscosity | double tile stability |
| --- | --- | --- | --- | --- |
| uncoated PAM 0 | comparison | 0.04% | 1140000 | 5 mm |
| coated PAM 1 | example 1 1% coating | 0.04% | 1200000 | 4 mm |
| coated PAM 2 | 2% coating | 0.04% | 1500000 | 3 mm |
| coated PAM 3 | 3% coating | 0.04% | 1700000 | 1 mm |
| coated PAM 4 | 5% coating | 0.04% | 2000000 | n. ap. |
| coated PAM 5 | 10% coating | 0.04% | 2400000 | n. ap. |
| coated PAM 6 | example 2 10% coating | 0.04% | 2200000 | n. ap. |
| coated PAM 7 | example 3 with 1% glyoxal | 0.04% | 1700000 | 3 mm |
| coated PAM 8 | 2% glyoxal | 0.04% | 2000000 | 1 mm |
| coated PAM 9 | 3% glyoxal | 0.04% | 1100000* | 5 mm* |
| coated PAM 10 | example 4 with 1% glyoxal | 0.04% | 2200000 | n. ap. |
| coated PAM 11 | 2% glyoxal | 0.04% | 900000* | 9 mm* |
| coated PAM 12 | 3% glyoxal | 0.04% | 700000* | slip* |
| coated PAM 13 | example 5 with 1% coating | 0.04% | 2200000 | n. ap. |
| coated PAM 14 | 3% coating | 0.04% | 900000* | 9 mm* |
| coated PAM 15 | 5% coating | 0.04% | 800000* | slip* |
| coated PAM 16 | 10% coating | 0.04% | 700000* | slip* |
| coated PAM 17 | example 6 with 1% coating | 0.04% | 1300000 | 4 mm |

TABLE 1-continued

| polyacrylamide (PAM) | amount used | viscosity | double tile stability |
|---|---|---|---|
| coated PAM 18 | 2% coating | 0.04% | 1700000 | 1 mm |
| coated PAM 19 | 5% coating | 0.04% | 2200000 | n. ap. |
| coated PAM 20 | 10% coating | 0.04% | 2500000 | n. ap. |

*The mixing time is not sufficient for the polymer with retarded solubility to completely develop.
A retarded increase in viscosity is found in all mixtures after waiting and briefly stirring. The time delay was up to 2 h
n. ap.: "no longer applicable": the viscosity is so high that the adhesive can no longer be applied to the concrete slab; it was therefore not possible to check the stability under load.

Example 7 Comparison

Experimental Setup 2000 g mortar according to mixture 1 was stirred with a commercial drill (1000 W, 2000 rpm) and a type M17 mortar mixer. 340 g mixing water was added per 1000 g dry mortar.

|  | Experiment 1 PAM 0 in the mixture | Experiment 2 PAM 0 addition after 12 sec. stirring |
|---|---|---|
| stirring (until homogeneous; in sec.) | 20 | <10 |
| stability with double tile (1900 g) | slips very rapidly | 9 mm |
| viscosity in mPa*s | 720000 | 1230000 |
| skin formation in minutes | 16 | 12 |
| mixing process | 20 sec. stirring 30 sec. scraping off 15 sec. stirring 3 min. maturing; 5 sec. stirring | 12 sec. stirring PAM addition 30 sec. scraping off 15 sec. stirring 3 min. maturing 5 sec. stirring |

Example 8 Comparison

Experimental Setup 2000 g mortar according to mixture 1 was stirred with a commercial drill (1000 W, 2000 rpm) and a type M17 mortar mixer. 340 g mixing water was added per 1000 g dry mortar.

|  | Experiment 3 PAM 0 in the mixture | Experiment 4 PAM 0 addition after 30 sec | Experiment 5 50% PAM 0 based on experiment 3. Addition after 30 sec |
|---|---|---|---|
| stirring in sec. | about 20 | <10 | <10 |
| stability with double tile (1900 g) | 5 mm | 0 mm | 9 mm |
| viscosity in mPa*s | 1140000 | 2380000 | 1010000 |
| skin formation in minutes | 11 | not evaluated | 12 |
| mixing process | 30 sec. stirring rate 1 60 sec. scraping off 60 sec. stirring rate 1 3 min maturing 15 sec. stirring rate 1 | 30 sec. stirring rate 1 PAM addition 60 sec. scraping off 60 sec. stirring rate 1 3 min. maturing 15 sec. stirring rate 1 | 30 sec. stirring rate 1 PAM addition 60 sec. scraping off 60 sec. stirring rate 1 3 min. maturing 15 sec. stirring rate 1 |

Example 9 Invention

Experimental Setup 2000 g mortar according to mixture 1 was stirred according to 4.4 of EN 196-1. 340 g mixing water was added per 1000 g dry mortar. The polyacrylamide was added according to the description "mixing process" in the table.

|  | Experiment 6 polyacrylamide with a charge density of 20% in the mixture | Experiment 7 polyacrylamide with a charge density of 20%, addition after 30 sec. | Experiment 8 polyacrylamide with a charge density of 40%, in the mixture | Experiment 9 polyacrylamide with a charge density of 40%, addition after 30 sec. | Experiment 10 50% polyacrylamide with a charge density of 40% based on experiment 8, addition after 30 sec. |
|---|---|---|---|---|---|
| stirring in sec. | about 20 | <10 | about 25 | <10 | <10 |
| position with double tile (1900 g) | 5 mm | 7 mm | 4 mm | not evaluated | 2 mm |
| viscosity in mPa * s | 1010000 | 1370000 | 1140000 | 2400000 | 1200000 |
| skin formation in minutes | 13 | 11 | 12 | not evaluated | 13 |
| mixing process | 30 sec. stirring rate 1 60 sec. | 30 sec. stirring rate 1 PAM addition | 30 sec. stirring rate 1 60 sec. | 30 sec. stirring rate 1 PAM addition | 30 sec. stirring rate 1 PAM addition |

-continued

|  | Experiment 6 polyacrylamide with a charge density of 20% in the mixture | Experiment 7 polyacrylamide with a charge density of 20%, addition after 30 sec. | Experiment 8 polyacrylamide with a charge density of 40% in the mixture | Experiment 9 polyacrylamide with a charge density of 40%, addition after 30 sec. | Experiment 10 50% polyacrylamide with a charge density of 40% based on experiment 8, addition after 30 sec. |
|---|---|---|---|---|---|
|  | scraping off 60 sec. stirring rate 1 3 min. maturing 15 sec. stirring rate 1 | 60 sec. scraping off 60 sec. stirring rate 1 3 min. maturing 15 sec. stirring rate 1 | scraping off 60 sec. stirring rate 1 3 min. maturing 15 sec. stirring rate 1 | 60 sec. scraping off 60 sec. stirring rate 1 3 min. maturing 15 sec. stirring rate 1 | 60 sec. scraping off 60 sec. stirring rate 1 3 min. maturing 15 sec. stirring rate 1 |

The effect of the delayed addition and its positive effect on the rheology (viscosity) is more pronounced in this example the higher the charge density of the polyacrylamide.

Example 10

Experimental Setup 12 kg mortar was stirred with a commercial drill (1000 W, 800 rpm) and a helical stirrer. 340 g mixing water was added per 1000 g dry mortar.

The sulfo group-containing polymer is the commercial product SWR 308/4198 from the Construction Research & Technology Company.

TABLE 2

|  | Mixture 1 | Mixture 2 | Mixture 3 | Mixture 4 |
|---|---|---|---|---|
| filler (quartz sand) | 60.00% | 60.00% | 60.00% | 60.00% |
| binder (CEM I 52.5 R) | 35.00% | 35.00% | 35.00% | 35.00% |
| dispersion powder (copolymer based on vinyl acetate/vinyl versatate | 3.60% | 3.60% | 3.80% | 3.80% |
| cellulose ether 20,000 | 0.42% | 0.42% | 0.28% | 0.28% |
| sulfo group-containing copolymer | — | — | 0.28% | 0.28% |
| starch ether | 0.16% | 0.16% | 0.10% | 0.10% |
| polyacrylamide comparison (PAM 0) | 0.04% | — | 0.04% | — |
| polyacrylamide coated (PAM 5) | — | 0.04% | — | 0.03% |
| cellulose fibre | 0.78% | 0.78% | 0.50% | 0.50% |
| total | 100.00% | 100.00% | 100.00% | 99.99% |
| $H_2O$ [g/kg] | 340 | 340 | 340 | 340 |
| stirring | very good to good | excellent | good | very good |
| Brookfield-viscosity [mPa*s] | 1350000 | 1240000 | 1260000 | 1320000 |

Due to the retarded activation of the thickener as an additive according to the invention an excellent easy stirring behaviour was achieved in mixtures 2 and 4. The build up of viscosity from a low viscosity to the end viscosity developed without a viscosity peak. All four mixtures showed a stability of 1 to 4 mm. In the case of mixture 4 it was possible to reduce the amount of the coated polyacrylamide by 25% due to a synergistic effect with the copolymer containing sulfo groups. In a mixture without the sulfo group-containing polymer (mixture 2) this reduction in the amount was not possible due to the loss of stability.

The retarded release of component A) (polyacrylamide) from the additive according to the invention into the dry mortar was achieved by coating the appropriate additive with a material which dissolved correspondingly slowly from the surface of the additive when the dry mortar is stirred in, where polyvinyl alcohol was used as a coating agent.

The invention claimed is:

1. An additive comprising at least one core component A) selected from an inorganic core component and an organic component wherein the organic core component comprises a non-cellulosic water-soluble, water-swellable or water-absorbable compound selected from the group consisting of an oligosaccharide, a polysaccharide, a sulfo group-containing copolymer and a copolymer based on acrylamide, and wherein the inorganic core component is derived from borax, ammonium sulphate or zeolite, with a rheology-enhancing property and a shell component B) applied to the same by virtue of a chemical interaction which acts as a coating, wherein the shell component B) forms chemical cross-links with the core component A) and wherein the shell component B) consists of a film-forming polymer selected from the group consisting of polyvinyl alcohol, polyvinyl acetate, polyvinyl pyrrolidine, polyvinylidene chloride, an alginate, a cellulose derivative, a starch derivative, gelatin, a wax, and mixtures thereof, or a dialdehyde, and at least one additional process additive selected from a plasticizer, an anticaking agent, or an antifoaming agent, and the shell component B) is applied onto the core component A) with the aid of component C), wherein component C) is a dialdehyde in liquid form and has resulted in a chemical crosslinking of the shell component B).

2. The additive according to claim 1, wherein, component A) exhibits at least one property selected from the group consisting of plasticity, dynamic viscosity, flow limit, rheopexy and thixotrophy.

3. The additive according to claim 1, wherein the sulfo group-containing copolymer is a water-soluble or water-swellable sulfo group-containing copolymer containing at least one a) 3 to 96 mole % structural groups of formula I;

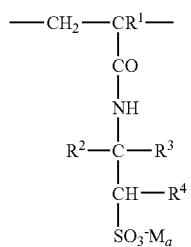
(I)

wherein $R^1$ is hydrogen or methyl, $R^2$, $R^3$ and $R^4$ are independently selected from hydrogen, an aliphatic hydrocarbon residue with 1 to 6 C atoms, or a phenyl residue optionally substituted with methyl groups;

M is hydrogen, a monovalent or divalent metal cation, ammonium or an organic amine residue; and A is ½ or 1;

b) 3 to 96 mole % of at least one structural croup of formula IIa or IIb

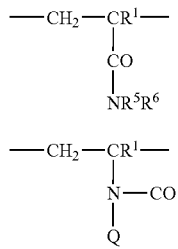
(IIa)
(IIb)

wherein $R^5$ and $R^6$ are independently hydrogen, an optionally substituted aliphatic hydrocarbon residue with 1 to 20 C atoms, a cycloaliphatic hydrocarbon residue with 5 to 8 C atoms, an aryl residue with 6 to 14 C atoms;

Q is hydrogen or —$CHR^5R^7$;

wherein if Q is not H, $R^5$ and $R^6$ in IIb together form a —$CH_2$—$(CH_2)_y$-methylene group in which y is from 1 to 4;

$R^7$ is hydrogen, an aliphatic hydrocarbon residue with 1 to 4 C atoms, —COOH or —COO$^-M_a$ and $R^1$ and M are as defined above, c) 0.05 to 75 mole % of a structural group of formula III

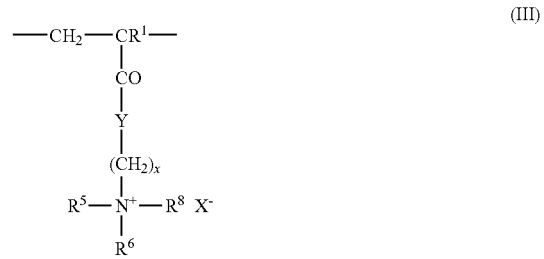
(III)

wherein Y is O, NH or $NR^5$;

$R^8$ is $R^5$ or $R^6$;

X is halogen, $C_1$ to $C_4$ alkylsulfate or $C_1$ to $C_4$ alkylsulfonate;

X is 1 to 6;

and $R^1$, $R^5$ and $R^6$ are as defined above;

d) 0.01 to 50 mole % of a structural group of formula IV

(IV)

wherein Z is —COO$(C_mH_{2m}O)_n$—$R^5$, —$(CH_2)_p$—O$(C_mH_{2m}O)_n$—$R^5$;

m is from 2 to 4;

n is from 0 to 200;

p is from 0 to 20;

and $R^1$ is defined above.

4. The additive according to claim 1, wherein the sulfo group-containing copolymer is a water-soluble or water-swellable sulfo group-containing copolymer comprising a) 3 to 96 mole % of a structural group of formula V

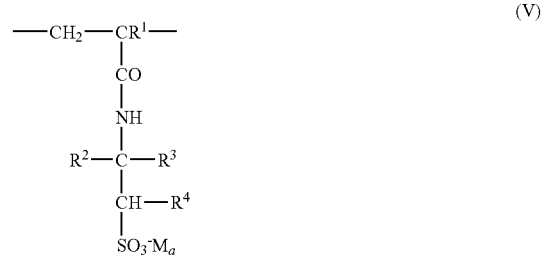
(V)

wherein $R^1$ is hydrogen or methyl $R^2$, $R^3$ and $R^4$ are independently hydrogen, an aliphatic hydrocarbon residue with 1 to 6 C atoms or a phenyl residue optionally substituted with methyl groups;

M is hydrogen, a monovalent or divalent metal cation, ammonium or an organic amine residue; and a is ½ or 1;

b) 3 to 96 mole % of a structural group of at least one of formula IVa or VIb

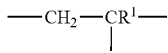   (VIa)

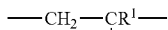   (VIb)

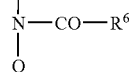

wherein W is —CO—, —CO—O—$(CH_2)_x$—, or —CO—$NR^2$—$(CH_2)_x$—;

x is 1 to 6;

$R^5$ and $R^6$ are independently hydrogen, an optionally substituted aliphatic hydrocarbon residue with 1 to 20 C atoms, a cycloaliphatic hydrocarbon residue with 5 to 8 C atoms, an aryl residue with, 6 to 14 C atoms and Q is hydrogen or —$CHR^5R^7$; wherein if Q is not H, $R^5$ and $R^6$ in IIb together form a —$CH_2$—$(CH_2)_y$-methylene group in which y=1 to 4;

$R^7$ is hydrogen, an aliphatic hydrocarbon residue with 1 to 4 C atoms, —COOH or —COO$^-M_a$; and $R^1$, $R^2$ and M are as defined above;

c) 0.05 to 75 mole % of a structural group of at least one of formula VIIa or VIIb

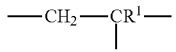   (VIIa)

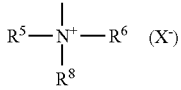

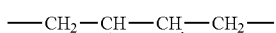   (VIIb)

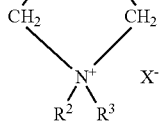

wherein Y is O, NH or $NR^5$;

V is —$(CH_2)_x$—,

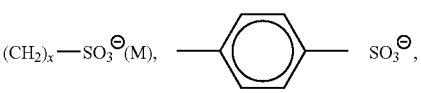

$R^8$ is $R^5$ or $R^6$, —$(CH_2)_x$—$SO_3^\ominus(M)$, 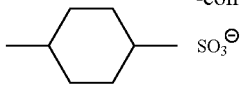 $SO_3^\ominus$, -continued

 $SO_3^\ominus$

X is halogen, $C_1$ to $C_4$ alkylsulfate or $C_1$ to $C_4$ alkylsulfonate; and $R^1$, $R^2$, $R^3$, $R^5$, $R^6$ and x are as defined above;

d) 0.01 to 30 mole % a structural group of formula VIII

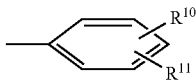   (VII)

wherein Z=—$COO(C_mH_{2m}O)_n$—$R^9$, —$(CH_2)_p$—O$(C_mH_{2m}O)_n$—$R^9$;

$R^9$ is

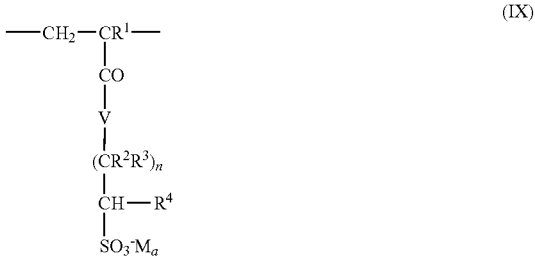

or a saturated or unsaturated, linear or branched, aliphatic hydrocarbon residues with 22 to 40 C atoms;

$R^{10}$ is H, $C_1$-$C_4$ alkyl, phenyl, benzyl, $C_1$-$C_4$ alkoxy, halogen, cyano, —COOH, —$COOR^5$, —CO—$NH_2$ or —$OCOR^5$;

$R^{11}$ is an arylalkyl group with a $C_1$-$C_{12}$ alkyl or $C_6$-$C_{14}$ aryl residue;

M is from 2 to 4;

n is from 0 to 200;

p is from 0 to 20;

and $R^1$ and $R^5$ are as defined above.

5. The additive according to claim 1, wherein the sulfo group-containing copolymer is a water-soluble sulfo group-containing copolymer and terpolymer having a number average molecular weight of 50,000 to 20,000,000 g/mol and contains a) 3 to 96 mole % of a structural group of formula IX $$\begin{array}{c}\text{—CH}_2\text{—CR}^1\text{—}\\|\\\text{CO}\\|\\\text{V}\\|\\(CR^2R^3)_n\\|\\\text{CH—R}^4\\|\\SO_3^-M_a\end{array}$$   (IX)

wherein $R^1$ is hydrogen or methyl;

$R^2$, $R^3$ and $R^4$ are independently hydrogen, an aliphatic hydrocarbon residue with 1 to 6 C atoms, a phenyl residue optionally substituted with methyl groups;

V is NH or oxygen;

M is hydrogen, a monovalent or divalent metal cation, ammonium or an organic amine residue;

n is from 1 to 5;

a is ½ or 1;

b) 3 to 96 mole % structural groups of structural formula X $$—CH_2—CR^1— \atop \underset{NR^5R^6}{\overset{|}{W}}$$ (X)

wherein W is $—CO(O)—(CH_2)_x—$ or $—CO—NR^2—(CH_2)_x—$;

x is from 1 to 6

$R^5$ and $R^6$ are independently hydrogen, an optionally substituted aliphatic hydrocarbon residue with 1 to 20 C atoms, a cycloaliphatic hydrocarbon residue with 5 to 8 C atoms or an aryl residue with 6 to 14 C atoms; and $R^1$ is as defined above; or c) 0.05 to 75 mole % of a structural group of formula XI $$—CH_2—CR^1— \atop \underset{R^5—\overset{|}{\underset{R^7}{N^+}}—R^6 \ (X^-)}{\overset{|}{\underset{V}{\overset{|}{\underset{|}{CO}}}}}$$ (XI)

wherein Y is O, NH or $NR^5$

V is $—(CH_2)_x—$,

―⟨benzene⟩―, ―⟨cyclohexane⟩―

$R^7$ is $R^5$ or $R^6$, $—(CH_2)_x—SO_3^\ominus M_a$, ―⟨benzene⟩―$SO_3^\ominus M_a$, ―⟨cyclohexane⟩―$SO_3^\ominus M_a$ X is halogen, $C_1$ to $C_4$ alkylsulfate or $C_1$ to $C_4$ alkylsulfonate; and $R^1$, $R^5$, $R^6$, M, a and x are defined above.

6. The additive according to claim 1, wherein the sulfo group-containing copolymer is a water-soluble sulfo group-containing copolymer comprising at least one of a) 3 to 96 mole % of formula XII $$—CH_2—CR^1— \atop \underset{SO_3M_a}{\overset{|}{\underset{CH—R^4}{\overset{|}{\underset{R^2—\overset{|}{C}—R^3}{\overset{|}{\underset{NH}{\overset{|}{CO}}}}}}}}$$ (XII)

wherein $R^1$ is hydrogen or methyl;

$R^2$, $R^3$ and $R^4$ are independently selected from hydrogen, an aliphatic hydrocarbon residue with 1 to 6 C atoms, a phenyl residue optionally substituted with a methyl group;

M is hydrogen, a monovalent cation, a divalent metal cation, ammonium or an organic amine residue; and a is ½ or 1;

b) 3 to 96 mole % of formula XIII $$—CH_2—CR^1— \atop \underset{NR^5R^6}{\overset{|}{\underset{CO}{\overset{|}{}}}}$$ (XIII)

wherein $R^1$ is as defined above; and $R^5$ and $R^6$ are independently of one another hydrogen, an aliphatic hydrocarbon residue with 1 to 20 C atoms, a cycloaliphatic hydrocarbon residue with 5 to 8 C atoms or an aryl residue with 6 to 14 C atoms;

c) 0.001 to 10 mole % of a structural group of formula XIV $$—CH_2—CR^1— \atop \overset{|}{Y}$$ (XIV)

wherein

Y is $—COO(C_nH_{2n}O)_p—R^7$, $—(CH_2)_q—O(C_nH_{2n}O)_p—R^7$;

$R^7$ is

―⟨benzene with $(R^8)_x$⟩

, or or an unsaturated, saturated, linear or branched aliphatic alkyl residue with 10 to 40 C atoms;

$R^8$ is H, $C_1$ to $C_6$ alkyl, an arylalkyl group with a $C_1$ to $C_{12}$ alkyl group or $C_6$ to $C_{14}$ aryl residue;

n is from 2 to 4;

p is from 0 to 200;

q is from 0 to 20
x is from 0 to 3 and
and $R^1$ is as defined above; and
d) 0.1 to 30 mole % of a structural group of formula (XV)

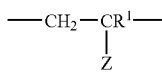

wherein
Z is $-(CH_2)_q-O(C_nH_{2n}O)_p-R^9$;
$R^9$ is H, $C_1$ to $C_4$ alkyl; and
$R^1$, n, p and q are as defined above.

7. The additive according to claim 6, wherein the copolymers consisting of structural groups a), b), c) and d) as well as a), b) or d) in addition contain up to 50 mole % based on the sum of the structural groups a), b), d) or c) of another structural group e) based on formula (XVI)

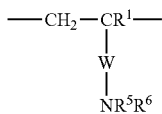

wherein
W is $-CO-O-(CH_2)_m-$ or $-CO-NR^2-(CH_2)_m-$;
M is from 1 to 6; and
$R^1$, $R^2$, $R^5$ and $R^6$ are as defined above.

8. The additive according to claim 1, wherein the polyacrylamide has non-ionic, anionic, cationic or amphoteric properties.

9. The additive according to claim 1, wherein component A) is partially cross-linked.

10. The additive according to claim 1, wherein component A) has an average particle size range of ≤500 μm.

11. The additive according to claim 1, wherein the additive has an average particle size range of ≤2000 μm.

12. A method for causing a time-delayed action in a composition comprising the step of adding the additive of claim 1 to the composition.

13. A paint comprising a paint and the additive of claim 1.

14. A method for time-controlling at least one of the increase in viscosity or development of rheology in filled aqueous systems comprising the step of adding the additive of claim 1 to the filled aqueous system.

15. The method of claim 14, further comprising the step of adding cellulose ethers or cellulose ether substitute to the filled aqueous system.

16. The method according to claim 15, wherein the cellulose ether substitutes are selected from the group consisting of an oligosaccharide, a polysaccharide, sulfo group-containing copolymers, copolymers based on acrylamide, a hydrocolloid-forming substance and a hydrogel-forming substance.

17. The method according to claim 14, wherein the filled aqueous systems are building material systems comprising an inorganic binder.

18. The method according to claim 17, wherein the building material systems are tile adhesives, plasters, setting compounds, joint fillers, wall mortars, repair mortars and jointing mortars.

19. The method according to claim 17, wherein the building material systems are suitable for mechanical stirring or mechanical application.

20. The additive according to claim 1, wherein the water-swellable or water-absorbable compound is a starch ether, welan gum, divtan guar, xanthan, chitosan or guar.

21. The additive according to claim 8, wherein the polyacrylamide is at least one of a homopolymer or copolymer of acrylamide having a monomer selected from acrylic acid, acrylamidopropanesulfonic acid, quarternated dimethylaminopropyl acrylamide or quarternated dimethylaminoethyl acrylate.

22. The additive according to claim 1, wherein the oligosaccharide or polysaccharide is selected from the group consisting of starch ethers, welan gum, diutan gum, xanthan, chitosan and guar derivatives.

23. The method according to claim 17, wherein the inorganic binder is a mineral binder.

24. The method according to claim 23, wherein the mineral binder is based on calcium sulfate.

25. The method according to claim 23, wherein the mineral binder is cement, gypsum, brine or anhydrite.

26. The method according to claim 19, wherein the dry mortar is a plaster or a tile adhesive.

27. The additive according to claim 1, wherein said crosslink is reversible.

* * * * *